United States Patent
Chen et al.

(10) Patent No.: US 10,970,011 B2
(45) Date of Patent: Apr. 6, 2021

(54) CONSUMABLE CHIP, CONSUMABLE AND CONSUMABLE COMMUNICATION METHOD

(71) Applicant: Hangzhou Chipjet Technology Co., Ltd., Hangzhou (CN)

(72) Inventors: Zhiye Chen, Hangzhou (CN); Zhengdong Zhang, Hangzhou (CN)

(73) Assignee: Hangzhou Chipjet Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/475,880

(22) PCT Filed: Aug. 10, 2018

(86) PCT No.: PCT/CN2018/099773
§ 371 (c)(1),
(2) Date: Jul. 3, 2019

(87) PCT Pub. No.: WO2019/196284
PCT Pub. Date: Oct. 17, 2019

(65) Prior Publication Data
US 2020/0257477 A1 Aug. 13, 2020

(30) Foreign Application Priority Data
Apr. 11, 2018 (CN) .......................... 201810318484.2

(51) Int. Cl.
*G06F 3/12* (2006.01)
(52) U.S. Cl.
CPC .......... *G06F 3/1222* (2013.01); *G06F 3/1229* (2013.01); *G06F 3/1238* (2013.01); *G06F 3/1239* (2013.01)

(58) Field of Classification Search
CPC .... G06F 3/1222; G06F 3/1229; G06F 3/1238; G06F 3/1239
(Continued)

(56) References Cited

U.S. PATENT DOCUMENTS 5,613,160 A * 3/1997 Kraslavsky ........... G06F 3/1285
710/16
6,430,711 B1 * 8/2002 Sekizawa ............ G06F 11/3006
358/1.14
(Continued)

FOREIGN PATENT DOCUMENTS

| CN | 102231054 A | 11/2011 |
| CN | 104057730 A | 9/2014 |
| CN | 107203359 A | 9/2017 |

OTHER PUBLICATIONS

International Search Report of PCT Patent Application No. PCT/CN2018/099773 dated Jan. 17, 2019.

*Primary Examiner* — Allen H Nguyen
(74) *Attorney, Agent, or Firm* — NZ Carr Law Office PLLC

(57) ABSTRACT

The present invention relates to the technical field of printer consumables, and particularly relates to a consumable chip, a consumable and a consumable communication method. The consumable chip directly executes a read request without verifying an imaging device check code in the read request of an imaging device, and then, the consumable chip can respond to the read request of the imaging device in time without being limited by an authentication mechanism of the imaging device, thereby increasing the response speed of the consumable chip to the read request of the imaging device, expanding the compatibility of the consumable chip for imaging devices of different types, and obtaining a certain fault-tolerant capability.

15 Claims, 3 Drawing Sheets

(58) Field of Classification Search
USPC .......................................................... 358/1.14
See application file for complete search history.

(56) References Cited

U.S. PATENT DOCUMENTS

| | | | | |
|---|---|---|---|---|
| 7,233,406 | B2* | 6/2007 | Ogura | ...................... H04L 12/12 |
| | | | | 358/1.14 |
| 2006/0132822 | A1* | 6/2006 | Walmsley | ................ G06F 21/57 |
| | | | | 358/1.14 |
| 2011/0075189 | A1* | 3/2011 | Refstrup | ................ G06F 21/608 |
| | | | | 358/1.14 |
| 2013/0169996 | A1* | 7/2013 | McLeod | ................ G06F 3/1204 |
| | | | | 358/3.28 |
| 2013/0321853 | A1* | 12/2013 | Lee | ...................... H04N 1/4433 |
| | | | | 358/1.14 |
| 2019/0034617 | A1* | 1/2019 | Scarlata | .............. G06F 9/30007 |

* cited by examiner

CONSUMABLE CHIP, CONSUMABLE AND CONSUMABLE COMMUNICATION METHOD

CROSS-REFERENCE TO RELATED APPLICATIONS

This applicant is a national applicant of PCT/CN2018/099773, filed on Aug. 10, 2018. The contents of PCT/CN2018/099773 are all hereby incorporated by reference.

BACKGROUND OF THE INVENTION

Technical Field

The present invention relates to the technical field of printer consumables, and particularly relates to a consumable chip, a consumable and a consumable communication method.

Background Art

When a consumable is mounted on an imaging device, the consumable can only be allowed to be in use after passing on-line authentication of the imaging device and authentication during the imaging operation. In order to pass the authentication of the imaging device, the consumable needs to perform feedback response to the imaging device according to the authentication mechanism of the imaging device. If the consumable does not feed the expected result back to the imaging device within the expected time of the imaging device, the consumable can not be used on the imaging device. Imaging devices of different brands or imaging devices of different types but the same brand may have different authentication mechanisms, such as different expected feedback times or different expected feedback results.

SUMMARY OF THE INVENTION

The present invention is directed to a consumable chip with higher stability, compatible universality and fault tolerance. The consumable chip comprises:

a communication circuit for receiving a read request of an imaging device, and a storage circuit for storing consumable information and consumable session keys, wherein the read request comprises an imaging device check code calculated by using an imaging device session key, and the consumable session key is related to the imaging device session key; and the consumable chip executes the read request without verifying the imaging device check code in the read request.

In the above technical solution, the consumable chip directly executes the read request without verifying the imaging device check code in the read request of the imaging device, and then, the consumable chip can respond to the read request of the imaging device in time without being limited by an authentication mechanism of the imaging device, thereby increasing the response speed of the consumable chip for the read request of the imaging device, expanding the compatibility of the consumable chip for imaging devices of different types, and obtaining a certain fault-tolerant capability.

Preferably, the condition that the imaging device check code in the read request is not verified includes: the imaging device check code is not acquired from the read request, thereby saving the time spent by the consumable chip for extracting useful information from the received read request, and increasing the feedback speed of the consumable chip for the read request of the imaging device.

Preferably, the condition that the imaging device check code in the read request is not verified includes: a consumable check code is not calculated based on the read request and the consumable session key. The consumable chip has no need of calculating the consumable check code, thereby simplifying the response flow of the consumable chip for the read request of the imaging device, increasing the feedback speed of the consumable chip for the read request of the imaging device, and avoiding the situation that the consumable can not pass the authentication of the imaging device due to incorrect calculation of the consumable chip.

Preferably, the condition that the imaging device check code in the read request is not verified includes: a consumable check code is calculated based on the read request and the consumable session key, but the consumable check code and the imaging device check code in the read request are not compared. The consumable chip has no need of comparing the consumable check code with the imaging device check code, thereby simplifying the response flow of the consumable chip for the read request of the imaging device, increasing the feedback speed of the consumable chip for the read request of the imaging device, and avoiding the situation that the consumable can not pass the authentication of the imaging device due to incorrect comparison operation of the consumable chip.

Preferably, the consumable chip claimed in the present application can also comprise: a logic circuit for calculating a consumable check code based on the consumable session key; and the consumable chip executes the read request by providing a response comprising the consumable check code. The response of the consumable chip to the read request of the imaging device comprises the consumable check code for authentication of the imaging device, and the authentication process of an imaging device terminal is retained, so that the consumable chip of the present application can ensure the communication security of the imaging device while achieving the technical effects claimed in the present application.

Preferably, the communication circuit receives a write request of the imaging device; the write request comprises an imaging device check code calculated by using the imaging device session key; the logic circuit calculates a consumable check code based on the write request and the consumable session key; the consumable chip executes the write request in response to the consumable check code matched with the imaging device check code in the write request; and the consumable chip rejects the write request in response to the consumable check code not matched with the imaging device check code in the write request. The consumable chip verifies the imaging device check code in the write request of the imaging device, so that the consumable chip of the present application can also ensure the write security of the consumable chip while achieving the technical effects claimed in the present application.

The present invention is also directed to a consumable, comprising:

a consumable chip for storing consumable information and consumable session keys, and a communication link for communicating the consumable chip with an imaging device when the consumable is mounted on the imaging device, the consumable chip receives a read request of the imaging device by means of the communication link;

wherein, the read request comprises an imaging device check code calculated by using an imaging device session key, and the imaging device session key is related to the consumable session key; and the consumable chip executes the read request without verifying the imaging device check code in the read request.

Similarly, in the above technical solution, the consumable chip directly executes the read request without verifying the imaging device check code in the read request of the imaging device, and then, the consumable chip can respond to the read request of the imaging device in time without being limited by an authentication mechanism of the imaging device, thereby increasing the response speed of the consumable chip for the read request of the imaging device, expanding the compatibility of the consumable chip for imaging devices of different types, and obtaining a certain fault-tolerant capability.

Preferably, the condition that the imaging device check code in the read request is not verified includes: the imaging device check code is not acquired from the read request.

Preferably, the condition that the imaging device check code in the read request is not verified includes: a consumable check code is not calculated based on the read request and the consumable session key.

Preferably, the condition that the imaging device check code in the read request is not verified includes: a consumable check code is calculated based on the read request and the consumable session key, but the consumable check code and the imaging device check code in the read request are not compared.

Preferably, the consumable chip executes the read request by providing a response comprising a consumable check code generated based on the consumable session key.

Preferably, the consumable chip receives a write request of the imaging device by means of the communication link, wherein the write request comprises an imaging device check code calculated by using the imaging device session key; and the consumable chip executes the write request in response to the consumable check code matched with the imaging device check code in the write request, and the consumable chip rejects the write request in response to the consumable check code not matched with the imaging device check code in the write request.

The present invention is also directed to a consumable communication method, comprising:

Sa-1, receiving a read request from an imaging device, wherein the read request comprises an imaging device check code generated based on an imaging device session key; and Sa-2, executing the read request without verifying the imaging device check code in the read request, wherein the imaging device session key is related to a consumable session key.

In the above technical solution, the consumable chip directly executes the read request without verifying the imaging device check code in the read request of the imaging device, and then, the consumable chip can respond to the read request of the imaging device in time without being limited by an authentication mechanism of the imaging device, thereby increasing the response speed of the consumable chip for the read request of the imaging device, expanding the compatibility of the consumable chip for imaging devices of different types, and obtaining a certain fault-tolerant capability.

Further, in step Sa-2, the read request is executed by providing a response comprising a consumable check code generated based on the consumable session key.

The consumable communication method further comprises: Sb-1, receiving a write request from the imaging device, wherein the write request comprises an imaging device check code generated based on the imaging device session key; Sb-2, generating a consumable check code based on the consumable session key; and Sb-3, executing the write request in response to the consumable check code matched with the imaging device check code in the write request, and rejecting the write request in response to the consumable check code not matched with the imaging device check code in the write request.

DETAILED DESCRIPTION OF THE INVENTION

Figure 1:
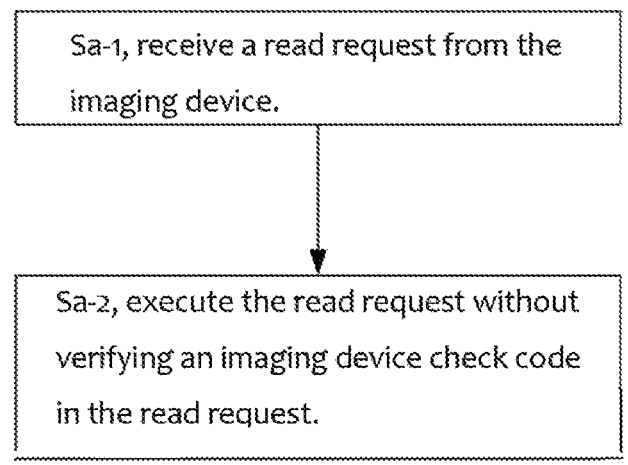
FIG. 1 is a flow diagram of a communication method of a consumable of the present invention for a read request of an imaging device.

The embodiments of the present invention are described in detail below with reference to the accompanying drawings.

The specific embodiment is only used for explaining the present invention but is not intended to limit the present invention. Technicians in this field can make modifications to this embodiment without creative contributions according to needs after finishing reading this specification, but the modifications are protected by the patent law if they fall within the scope of the claims of the present invention.

An existing imaging system comprises an imaging device and a consumable capable of being mounted in the imaging device. The imaging device comprises an imaging device storage circuit and an imaging device logic circuit. The imaging device storage circuit comprises a non-volatile memory and a volatile memory. The non-volatile memory stores session key identifiers of the imaging device. The imaging device logic circuit generates an imaging device session key for authenticating the consumable based on the session key identifier, and stores the generated imaging device session key in the volatile memory.

The consumable 300 can be mounted in the imaging device 200 to provide an imaging material for the imaging device and can be replaced after the imaging material is used up, such as an ink jet box or an ink jet box with ink jet and printing head components, an ink powder box, an ink supply box. The consumable comprises a consumable chip 200 and a communication link 301, and the communication link is used for communicating the consumable chip with the imaging device when the consumable is mounted on the imaging device, so that the consumable chip of the consumable mounted in the imaging device can be communicated with the imaging device. Specifically, the consumable chip in this embodiment comprises a communication circuit 101, a storage circuit 102 and a logic circuit 103. The storage circuit comprises a volatile memory 1031 and a non-volatile memory 1032. The non-volatile memory stores consumable information and consumable session key identifiers, wherein the consumable information includes the model, type, ink volume, serial number and the like of the consumable. The logic circuit of the consumable generates a consumable session key for communication authentication between the consumable and the imaging device based on the session key identifier.

The process for authenticating the consumable mounted in the imaging device comprises:

1. Establishment of Session Key

After the consumable is mounted on the imaging device, the consumable chip is communicated with the imaging device by means of the communication link. The imaging device sends a session key identifier request to the consumable chip after detecting the mounting of the consumable. The consumable chip receives the session key identifier request from the imaging device by means of the communication circuit, sends the session key identifier stored in the non-volatile memory to the imaging device so as to respond to the session key identifier request of the imaging device, calculates a consumable session key for communication authentication based on the session key identifier, and stores the generated consumable session key in the volatile memory thereof. After receiving the response of the consumable chip, the imaging device generates an imaging device session key based on the session key identifier from the consumable chip, and stores the imaging device session key in the volatile memory thereof. The consumable session key and imaging device session key generated based on the same session key identifier are matched and are used for subsequent communication authentication between the imaging device and the consumable.

In an embodiment, the volatile memory of the consumable stores a plurality of session key identifiers, and the consumable chip selects a stored session key identifier and supply it to the imaging device in response to the session key identifier request of the imaging device, generates a consumable session key for communication authentication between the imaging device and the consumable based on the selected session key identifier, and stores the generated consumable session key in the volatile memory. The consumable determines the session key for communication authentication based on the session key identifier selected by the consumable chip rather than generated by calculation. The calculation process of the session key identifier is avoided, thereby increasing the response speed of the consumable chip for the read request of the imaging device, and reducing the error rate. Preferably, the consumable chip selects an unused session key identifier in the non-volatile memory and supplies it to the imaging device in response to the session key identifier request of the imaging device. Or the consumable chip sequentially selects a plurality of session key identifiers stored in the non-volatile memory and supplies them to the imaging device, so that the session key identifiers used by the consumable in response to each session key identifier request of the imaging device are different so as to further improve the safety. The number of the session key identifiers can be as much as possible in a storage number scope, and preferably, the session key identifiers of which the number is greater than the number of communication between the consumable and the imaging device are stored (imaging materials in the consumable are limited, and the number of communication between the consumable and the imaging device is also limited), thereby ensuring that the session key identifiers used by the consumable in response to each session key identifier request of the imaging device are different. If the number of the session key identifiers which can be stored in the non-volatile memory is less than the number of communication between the consumable and the imaging device, a reset operation can be performed after the stored session key identifiers are used up, and the session key identifiers stored in the volatile memory are updated, thereby ensuring that the session key identifiers used by the consumable in response to each session key identifier request of the imaging device are different.

2. Communication Authentication Between Consumable and Imaging Device

After a session key is established between the consumable and the imaging device, the imaging device sends a read request to the consumable so as to acquire the consumable information stored in the consumable chip, and the imaging device sends a write request to the consumable so as to modify the consumable information stored in the consumable chip.

A. Read Request Response Process of Imaging Device

The imaging device calculates an imaging device check code for the read request by using an imaging device session key and an appropriate cryptographic algorithm. The imaging device check code in the read request is calculated with respect to a command and command parameters of the read request. For example, based on the command and command parameters of the read request, an appropriate encryption algorithm is adopted to calculate the imaging device check code. Imaging devices of different brands or imaging devices of different types but the same brand have different encryption methods for imaging device check codes. FIG. 1 is a flow diagram of a communication method of the consumable for the read request of the imaging device. In step Sa-1, the consumable mounted in the imaging device receives the read request from the imaging device.

In step Sa-2, in order to enable the consumable chip to respond to the read request of the imaging device in time without being limited by an authentication mechanism of the imaging device, the response speed of the consumable chip for the read request of the imaging device is increased, the compatibility of the consumable chip for imaging devices of different types is expanded, and a certain fault-tolerant capability is obtained. After the consumable in this embodiment receives the read request of the imaging device, the consumable chip directly executes the read request without verifying the imaging device check code in the read request of the imaging device. In an embodiment, the condition that the imaging device check code in the read request of the imaging device is not verified means that after the consumable chip receives the read request from the imaging device, only the command parameters of the read request in the read request are extracted, the imaging device check code in the read request is not acquired from the read request, and the consumable chip directly responds to the read request according to the command parameters of the read request. In another embodiment, the condition that the imaging device check code in the read request of the imaging device is not verified means that after the consumable chip receives the read request from the imaging device, the command parameters of the read request and the imaging device check code in the read request are extracted, but the imaging device check code is not stored, the logic circuit of the consumable chip also does not execute calculation of the consumable check code based on the read request and the consumable session key, and the consumable chip directly responds to the read request according to the command parameters of the read request. In another embodiment, the condition that the imaging device check code in the read request of the imaging device is not verified means that after the consumable chip receives the read request from the imaging device, the command parameters of the read request and the imaging device check code in the read request are extracted, and the imaging device check code is stored in the non-volatile memory. The logic circuit of the consumable chip calculates the consumable check code based on the read request and the consumable session key, does not store the consumable check code, does not compare the consumable check code with the imaging device check code in the read request command, and the consumable chip responds to the read request according to the command parameters of the read request.

The operation for executing the read request by the consumable chip comprises the processes of querying the consumable information needing to be read by the imaging device and sending the consumable information to the imaging device to respond to the read request of the imaging device, the consumable information can be querying according to the parameters of the read request in the storage circuit. The consumable chip executes the read request by providing the response comprising the consumable check code generated based on the consumable session key. The consumable check code in the read request response of the consumable is calculated with respect to the command and command parameters of the read request response. For example, based on the command and command parameters of the read request response, an appropriate encryption algorithm is adopted to calculate the consumable check code. In this embodiment, the logic circuit of the consumable chip calculates a consumable check code with respect to the command and command parameters of the read request response based on the consumable session key, and sends the response comprising the consumable check code to the imaging device.

After the imaging device receives the read request response of the consumable, the imaging device extracts the command and command parameters of the read request response and the consumable check code in the read request response, and stores the consumable check code. The logic circuit of the imaging device calculates and stores the imaging device check code based on the read request response and the imaging device session key. The logic circuit of the imaging device compares whether the consumable check code in the read request is matched with the calculated imaging device check code or not so as to authenticate the read request response of the consumable chip. If the consumable check code in the read request is matched with the calculated imaging device check code, the consumable passes the authentication of the imaging device, and the imaging device extracts the consumable information in the read request response to perform the next operation; and if the consumable check code in the read request is not matched with the calculated imaging device check code, the consumable does not pass the authentication of the imaging device, and the imaging device reports an error. The operation of reporting an error by the imaging device includes: the imaging device does not extract the consumable information in the read request response, the current operation of the imaging device is stopped, and the imaging device session key stored in a volatile memory of the imaging device is deleted. The response of the consumable chip to the read request of the imaging device comprises the consumable check code for authentication of the imaging device, and the authentication process of the imaging device terminal is retained, so that the consumable chip of the present application can ensure the communication security of the imaging device while achieving the technical effects claimed in the present application.

B. Write Request of Imaging Device

Figure 2:
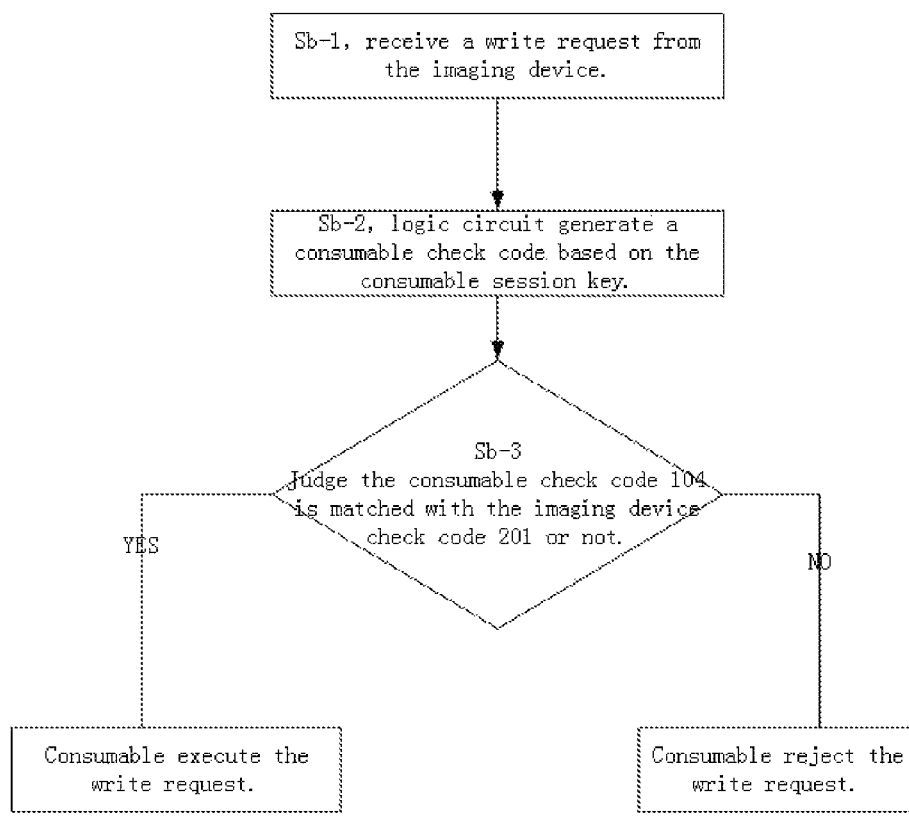
FIG. 2 is a flow diagram of a communication method of the consumable of the present invention for a write request of the imaging device.
Figure 3:
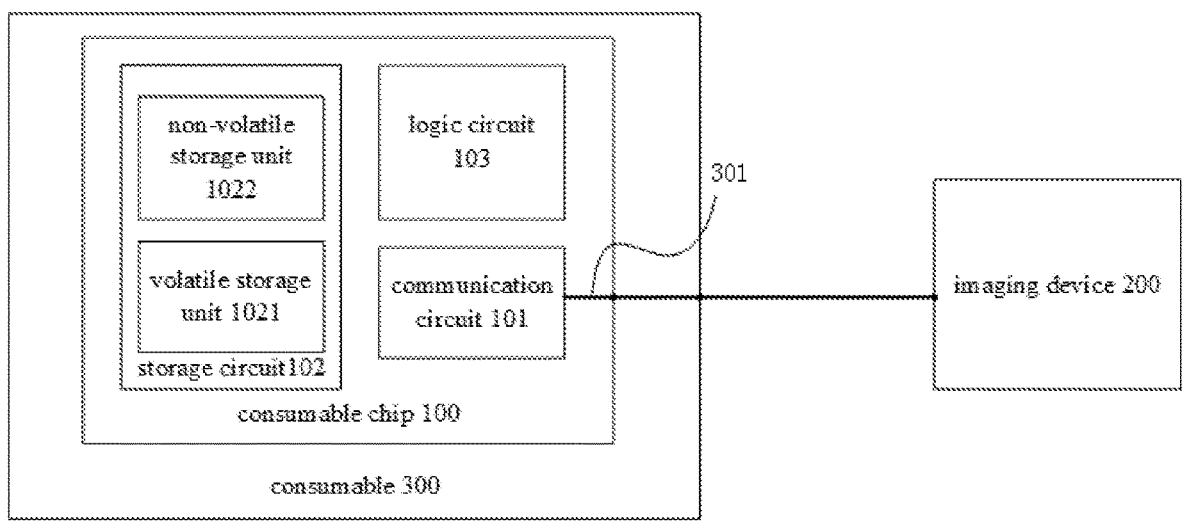
FIG. 3 is a schematic diagram of the imaging system.

The imaging device calculates an imaging device check code for the write request by using an imaging device session key and an appropriate cryptographic algorithm. The imaging device check code in the write request is calculated with respect to the command and command parameters of the write request. For example, based on the command and command parameters of the write request, an appropriate encryption algorithm is adopted to calculate the imaging device check code 201. Imaging devices of different brands or imaging devices of different types but the same brand have different encryption methods for imaging device check codes. FIG. 2 is a flow diagram of a communication method of the consumable for the write request of the imaging device. In step Sb-1, the consumable mounted in the imaging device receives the write request from the imaging device.

In order to ensure the write security of the consumable chip and prevent the consumable information stored in the consumable chip from being maliciously tampered by a third party.

In step Sb-2, the consumable chip verifies the imaging device check code in the write request of the imaging device. In this embodiment, after the consumable receives the write request of the imaging device, the consumable chip extracts the command parameters of the write request and the imaging device check code in the write request, and stores the imaging device check code in the non-volatile memory. The logic circuit of the consumable chip calculates a consumable check code with respect to the write request based on the write request and the consumable session key, and stores the consumable check code.

In step Sb-3, the logic circuit of the consumable compares whether the imaging device check code 201 in the write request is matched with the calculated consumable check code 104 or not so as to authenticate the write request response of the imaging device. If the imaging device check code in the write request is matched with the calculated consumable check code, the imaging device passes the authentication of the consumable, and the consumable extracts the command parameters in the write request to execute the write request; and if the imaging device check code in the write request is not matched with the calculated consumable check code, the imaging device does not pass the authentication of the consumable, and the consumable rejects the write request. The operation of rejecting the write request includes: the write request is not executed, and the consumable session key stored in the volatile memory of the consumable is deleted.

Although the embodiments of the present invention are described with reference to the accompanying drawings, common technicians in this field can make various variations or modifications within the scope of the appended claims.

What is claimed is:

1. A consumable chip, characterized by comprising:
a communication circuit for receiving a read request of an imaging device, and
a storage circuit for storing consumable information and consumable session keys,
wherein the read request comprises an imaging device check code calculated by using an imaging device session key, and the consumable session key is related to the imaging device session key; and the consumable chip executes the read request without verifying the imaging device check code in the read request.

2. The consumable chip according to claim 1, wherein a condition that the imaging device check code in the read request is not verified includes:
the imaging device check code is not acquired from the read request.

3. The consumable chip according to claim 1, wherein a condition that the imaging device check code in the read request is not verified includes:
a consumable check code is not calculated based on the read request and the consumable session key.

4. The consumable chip according to claim 1, wherein a condition that the imaging device check code in the read request is not verified includes:
a consumable check code is calculated based on the read request and the consumable session key, but the consumable check code and the imaging device check code in the read request are not compared.

5. The consumable chip according to claim 1, also comprising:
a logic circuit for calculating a consumable check code based on the consumable session key; and
the consumable chip executes the read request by providing a response comprising the consumable check code.

6. The consumable chip according to claim 5, wherein
the communication circuit receives a write request of the imaging device;
the write request comprises an imaging device check code calculated by using the imaging device session key; and
the logic circuit calculates a consumable check code based on the write request and the consumable session key, wherein the consumable chip executes the write request in response to the consumable check code matched with the imaging device check code in the write request, and the consumable chip rejects the write request in response to the consumable check code not matched with the imaging device check code in the write request.

7. A consumable, characterized by comprising:
a consumable chip for storing consumable information and consumable session key, and
a communication link for communicating the consumable chip with an imaging device when the consumable is mounted on the imaging device,
the consumable chip receives a read request of the imaging device by means of the communication link; wherein,
the read request comprises an imaging device check code calculated by using an imaging device session key, and the imaging device session key is related to the consumable session key; and
the consumable chip executes the read request without verifying the imaging device check code in the read request.

8. The consumable according to claim 7, wherein a condition that the imaging device check code in the read request is not verified includes:
the imaging device check code is not acquired from the read request.

9. The consumable according to claim 7, wherein a condition that the imaging device check code in the read request is not verified includes:
a consumable check code is not calculated based on the read request and the consumable session key.

10. The consumable according to claim 7, wherein a condition that the imaging device check code in the read request is not verified includes:
a consumable check code is calculated based on the read request and the consumable session key, but the consumable check code and the imaging device check code in the read request are not compared.

11. The consumable according to claim 7, wherein the consumable chip executes the read request by providing a response comprising a consumable check code generated based on the consumable session key.

12. The consumable according to claim 11, wherein
the consumable chip receives a write request of the imaging device by means of the communication link;
the write request comprises an imaging device check code calculated by using the imaging device session key; and
the consumable chip executes the write request in response to the consumable check code matched with the imaging device check code in the write request, and the consumable chip rejects the write request in response to the consumable check code not matched with the imaging device check code in the write request.

13. A consumable communication method, characterized by comprising:
Sa-1, receiving a read request from an imaging device, wherein the read request comprises an imaging device check code generated based on an imaging device session key; and
Sa-2, executing the read request without verifying the imaging device check code in the read request,
wherein the imaging device session key is related to a consumable session key.

14. The consumable communication method according to claim 13, wherein in step Sa-2,
the read request is executed by providing a response comprising a consumable check code generated based on the consumable session key.

15. The consumable communication method according to claim 14, also comprising:
Sb-1, receiving a write request from the imaging device, wherein the write request comprises an imaging device check code generated based on the imaging device session key;
Sb-2, generating a consumable check code based on the consumable session key;
Sb-3, executing the write request in response to the consumable check code matched with the imaging device check code in the write request, and rejecting the write request in response to the consumable check code not matched with the imaging device check code in the write request.

* * * * *